(12) United States Patent
Ohta et al.

(10) Patent No.: US 7,683,980 B2
(45) Date of Patent: *Mar. 23, 2010

(54) OPTICAL ELEMENT ENCLOSURE HAVING CONTRACTIVE ENCLOSING MEMBER WITH OPENING AT CORNER/CURVATURE PORTION, BACKLIGHT, AND LIQUID CRYSTAL DISPLAY DEVICE

(75) Inventors: Eiji Ohta, Miyagi (JP); Ken Hosoya, Miyagi (JP); Yasuyuki Kudo, Miyagi (JP); Shigehiro Yamakita, Miyagi (JP); Masayasu Kakinuma, Miyagi (JP); Taku Ishimori, Miyagi (JP); Shogo Shinkai, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/212,194

(22) Filed: Sep. 17, 2008

(65) Prior Publication Data

US 2009/0079900 A1    Mar. 26, 2009

(30) Foreign Application Priority Data

Sep. 21, 2007   (JP) .............................. 2007-246295

(51) Int. Cl.
*G02F 1/1333*   (2006.01)
(52) U.S. Cl. .............................. 349/60; 349/58; 349/64; 359/507
(58) Field of Classification Search ............ 359/507, 359/513, 514; 349/60
See application file for complete search history.

(56) References Cited

U.S. PATENT DOCUMENTS 6,538,709 B1 * 3/2003 Kurihara et al. ............... 349/58
7,085,061 B2    8/2006 Watanabe

FOREIGN PATENT DOCUMENTS

| JP | 63-065422 | 3/1988 |
| JP | 2001-272509 | 10/2001 |
| JP | 2001-338508 | 12/2001 |
| JP | 2005-301147 | 10/2005 |
| JP | 2005-347272 | 12/2005 |
| JP | 2007-033524 | 2/2007 |

* cited by examiner

*Primary Examiner*—Andrew Schechter
(74) *Attorney, Agent, or Firm*—K&L Gates LLP

(57) ABSTRACT

An optical element covering member includes: at least one optical element; a support medium supporting the at least one optical element; and a shrinkable covering member covering the at least one optical element and the support medium. In the optical element covering member, among sides forming primary surfaces of the support medium, at least one set of sides facing each other is covered with the covering member, and the following equation (1) is satisfied under conditions at a temperature of 70° C., $$0 \leq F \leq 1.65 \times 10^4 \times t/L \quad (1)$$

where t indicates the thickness of the support medium, L indicates the length of the side of the support medium covered with the covering member, F indicates a tensile force of the covering member, which acts in a direction parallel to the side having the length L.

19 Claims, 12 Drawing Sheets

OPTICAL ELEMENT ENCLOSURE HAVING CONTRACTIVE ENCLOSING MEMBER WITH OPENING AT CORNER/CURVATURE PORTION, BACKLIGHT, AND LIQUID CRYSTAL DISPLAY DEVICE

CROSS REFERENCES TO RELATED APPLICATIONS

The present application claims priority to Japanese Patent Application JP 2007-246295 filed in the Japanese Patent Office on Sep. 21, 2007, the entire contents of which is incorporated herein by reference.

BACKGROUND

The present application relates to an optical element covering member, a backlight including the same, and a liquid crystal display device, and more particularly, relates to an optical element covering member which improves display performance of a liquid crystal display device.

Heretofore, in a liquid crystal display device, many optical elements have been used in order to improve the viewing angle, luminance, and the like. As these optical elements, films and sheets, such as a diffusion film and a prism sheet, have been used.

FIG. 15 shows the structure of a liquid crystal display device of a related art. This liquid crystal display device includes, as shown in FIG. 15, a lighting element 101 emitting light, a diffusion plate 102 diffusing light emitted from the lighting element 101, a plurality of optical elements 103 condensing and/or diffusing light diffused by the diffusion plate 102, and a liquid crystal panel 104.

Incidentally, in recent years, concomitant with an increase in size of a liquid crystal display device, the weight and size of an optical element itself tends to increase. When the weight and size of an optical element itself increases, since the rigidity thereof becomes insufficient, the optical element is liable to be deformed. The deformation of the optical element as described above causes adverse influence on optical directional characteristics to a display surface, and as a result, a serious problem, that is, luminance irregularity, may arise.

Accordingly, an improvement of insufficient rigidity of an optical element by increasing the thickness thereof has been proposed. However, since the thickness of a liquid crystal display device is increased, its advantageous properties, such as small thickness and light weight, are degraded. Hence, it has been proposed that by bonding optical elements to each other with a transparent adhesive, insufficient rigidity of an optical element in the form of a sheet or a film is improved (for example, see Japanese Unexamined Patent Application Publication No. 2005-301147).

SUMMARY

However, according to the technique disclosed in Japanese Unexamined Patent Application Publication No. 2005-301147, since the optical elements are bonded to each other with a transparent adhesive, although it is not so serious as compared to the improvement method in which the thicknesses of optical elements are increased, the thickness of the liquid crystal display device itself is also disadvantageously increased. In addition, since the transparent adhesive is used, the display performance of the liquid crystal display device may be degraded in some cases.

Hence, it is desirable to provide an optical element covering member which can improve insufficient rigidity of an optical element while suppressing an increase in thickness of a liquid crystal display device and which does not degrade display performance thereof; a backlight including the optical element covering member; and a liquid crystal display device including the backlight.

Through intensive research carried out by the inventors of the present application in order to improve insufficient rigidity of an optical element while an increase in thickness of a liquid crystal display device and degradation in display performance thereof are suppressed, an optical element covering member was made in which an optical element and a support medium are covered with a covering member.

However, when a covering member having shrinkable properties is used for the above optical element covering member, if a shrinkable stress is allowed to excessively remain since the shrinkable properties of the covering member are not uniform, a stress applied to a support medium is excessively increased, and as a result, warping and twisting occur. For example, when the optical element covering member protrudes to and comes into contact with a liquid crystal panel of a liquid crystal display device to apply a pressure thereto, light-shielding properties of liquid crystal are degraded, and image quality defects, such as light leakage, may occur in some cases. In addition, when the optical element covering member is warped to protrude to a backlight side, a strain is generated in the support medium, and an optical film is undulated to increase luminance irregularities, or an end portion of the optical element covering member is warped to a liquid crystal panel side to cause light leakage or the like, so that image quality defects occur. When the optical element covering member is strongly warped to the backlight side, the clearance therebetween is decreased to zero, and as a result, defects, such as generation of creaking noise, occur.

Accordingly, in order to suppress the degradation in image quality caused by the optical element covering member, the inventors of the present application carried out intensive research. As a result, it was finally determined that when the tensile force of a shrinkable covering member is controlled with respect to inclusion members covered therewith, the generation of warping and creaking noise can be suppressed.

The present application was made based on the above intensive research.

According to an embodiment, there is provided an optical element covering member which includes: at least one optical element; a support medium supporting the at least one optical element; and a shrinkable covering member covering the at least one optical element and the support medium, wherein among sides forming primary surfaces of the support medium, at least one set of sides facing each other is covered with the covering member, and the following equation (1) is satisfied under conditions at a temperature of 70° C., $$0 \leq F \leq 1.65 \times 10^4 \times t/L \quad (1)$$

where t indicates the thickness of the support medium, L indicates the length of the side of the support medium covered with the covering member, F indicates a tensile force of the covering member, which acts in a direction parallel to the side having the length L.

According to an embodiment, since the at least one optical element and the support medium are covered with the covering member, the at least one optical element and the support medium are united together. Hence, the insufficient rigidity of the optical element can be compensated for by the support medium.

In addition, according to an embodiment, by controlling the tensile force of the shrinkable covering member with respect to each side of the support medium covered therewith, while the generation of sags, irregularities, and wrinkles is suppressed, the generation of warping is suppressed, and in addition, the degradation in image quality, such as light leakage, and the generation of creaking noise caused by warping can be suppressed.

As thus described, according to an embodiment, while an increase in thickness of a liquid crystal display device and/or degradation in display performance thereof is suppressed, the insufficient rigidity of the optical element can be improved. In addition, while the generation of warping is suppressed without causing sags, irregularities, and wrinkles of the covering member, the degradation in image quality, such as light leakage, is suppressed, and the generation of defects, such as creaking noise, can be suppressed.

Additional features and advantages are described herein, and will be apparent from the following Detailed Description and the figures.

DETAILED DESCRIPTION

Figure 1:
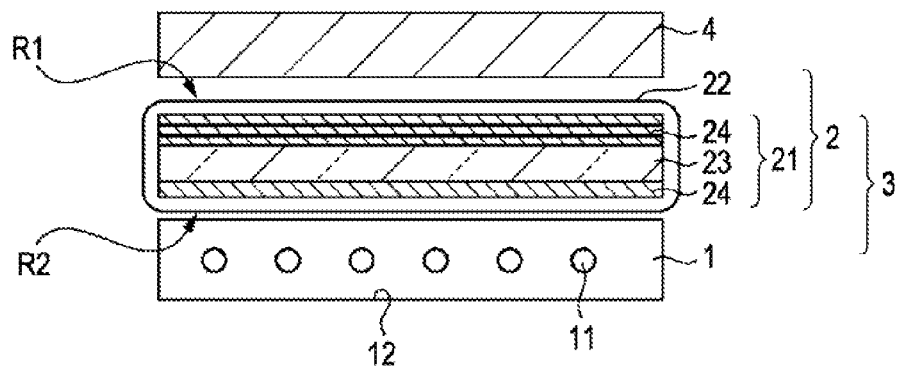
FIG. 1 is a schematic view showing one structural example of a liquid crystal display device according to a first embodiment.

Hereinafter, embodiments of the present application will be described with reference to the drawings. In all the drawings of the embodiments, the same or corresponding element is designated by the same reference numeral.

(1) First Embodiment (1-1) Structure of Liquid Crystal Display Device

FIG. 1 shows one structural example of a liquid crystal display device according to a first embodiment. As shown in FIG. 1, this liquid crystal display device includes a backlight 3 emitting light and a liquid crystal panel 4 displaying an image based on light emitted from the backlight 3. The backlight 3 includes a lighting element 1 and an optical element covering member 2 which improves properties of light emitted from the lighting element 1 and which emits light thus improved to the liquid crystal panel 4. Hereinafter, in various types of optical elements, such as the optical element covering member 2, a surface on which light is incident from the lighting element 1 is called an incident surface, a surface emitting light incident on the incident surface is called a transmission surface, and a surface located between the incident surface and the transmission surface is called an end surface. In addition, the incident surface and the transmission surface are each generally called a primary surface in some cases.

The lighting element 1 is, for example, a direct under type lighting element and includes at least one light source 11 emitting light and a reflection plate 12 reflecting light emitted from the light source 11 in the direction to the liquid crystal panel 4. As the light source 11, for example, a cold cathode fluorescent lamp (CCFL), a hot cathode fluorescent lamp (HCFL), an organic electroluminescence (OEL), an inorganic electroluminescence (IEL), and a light emitting diode (LED) may be used. The reflection plate 12 is provided, for example, so as to cover the bottom or the side of the light source 11 and so as to reflect light, which is emitted from the light source 11 to the lower side or the lateral side thereof, in the direction to the liquid crystal panel 4.

The optical element covering member 2 includes, for example, at least one optical element 24 which changes light properties by performing a treatment, such as diffusion or condensation, for light emitted from the lighting element 1, a support medium 23 which supports the at least one optical element 24, and a covering member 22 which covers the at least one optical element 24 and the support medium 23 and units them together. The optical element 24 is provided on at least one of the incident surface and the transmission surface of the support medium 23. Hereinafter, the support medium 23 and the at least one optical element 24 stacked thereto are collectively called an optical element stack 21.

The number and the type of optical elements 24 are not particularly limited and may be appropriately selected in accordance with desired properties of a liquid crystal display device. As the optical element 24, for example, at least one functional layer together with the support medium 23 may also used. In addition, without using the support medium, the structure including only a functional layer may also be used. As the optical element 24, for example, a light diffusion element, a light condensation element, a reflection type polarizer, a polarizer, or a light division element may be used. As the optical element 24, for example, an element in the form of a film, a sheet, or a plate may be used. The thickness of the optical element 24 is preferably 5 to 3,000 μm and more preferably 25 to 1,000 μm. When the optical element 24 is covered together with the support medium 23, the thickness of the optical element 24 can be decreased by approximately 20% to 50% as compared to that in the case in which the optical elements 24 are stacked to each other.

The support medium 23 is, for example, a transparent plate transmitting light emitted from the lighting element 1 or an optical plate changing light properties by performing a treatment, such as diffusion or condensation, for light emitted from the lighting element 1. As the optical plate, for example, a diffusion plate, a retardation plate, or a prism plate may be used. The thickness of the support medium 23 is, for example, 1,000 to 50,000 µm. The support medium 23 is formed, for example, of a high molecular weight material, and the transmittance thereof is preferably 30% or more. In addition, the order of stack of the optical element 24 and the support medium 23 is determined, for example, in accordance with the functions of the optical element 24 and the support medium 23. For example, when the support medium 23 is a diffusion plate, the support medium 23 is provided at a side on which light emitted from the lighting element 1 is incident, and when the support medium 23 is a reflection type polarizer, the support medium 23 is provided at a side from which light is emitted to the liquid crystal panel 4. The shapes of the incident surface and the transmission surface of the optical element 24 and those of the support medium 23 may be selected in accordance with the shape of the liquid crystal panel 4 and are, for example, a rectangular shape in which the ratio (aspect ratio) of the longitudinal length to the lateral length is not 1. In addition, the support medium 23 preferably has an appropriate rigidity; as a material therefor, a material having an elastic modulus of approximately 1.5 GPa or more at room temperature is preferably used, and for example, polycarbonate, poly(methyl methacrylate), polystyrene, a cycloolefinic resin (such as ZEONOR (registered trade name), and glass may be mentioned.

The primary surfaces of the optical element 24 and the support medium 23 are preferably processed by a roughing treatment or are preferably processed to contain fine particles. The reason for this is that rubbing and friction can be decreased. In addition, additives, such as a light stabilizer, a UV absorber, an antistatic agent, a flame retardant, and an antioxidant, may be contained, whenever necessary, in the optical element 24 and the support medium 23 so as to impart thereto a UV absorption function, an infrared absorption function, an antistatic function, and the like. In addition, by performing a surface treatment, such as an antireflection treatment (AR treatment) or an antiglare treatment (AG treatment), on the optical element 24 and the support medium 23, reflection light may be diffused, or reflection light itself may be decreased. In addition, functions of reflecting ultraviolet rays and/or infrared rays may be imparted to the surface of the optical element 24 and that of the support medium 23.

The covering member 22 is, for example, a single-layer or a multi-layer film or sheet having transparent properties. The covering member 22 has, for example, a bag shape, and all the surfaces of the optical element stack 21 are covered with this covering member 22. In addition, end portions of two films overlapped with each other with the optical element stack 21 provided therebetween may be bonded to each other so as to form the covering member 22 to have two, three, or four closed sides. In particular, as the covering member 22 having two closed sides, for example, there may be mentioned a covering member formed by bonding end portions of a sheet-shaped film or sheet in a longitudinal direction to each other or a covering member formed by overlapping two rectangular films or sheets followed by bonding two sides of one film or sheet to two respective sides of the other film or sheet. As the covering member 22 having three closed sides, for example, there may be mentioned a covering member formed by folding a sheet-shaped film or sheet in a longitudinal direction so that end portions thereof are overlapped to each other, followed by bonding two sides of one part of the folded film or sheet to respective two sides of the other part of the folded film or sheet, or a covering member formed by overlapping two rectangular films or sheets followed by bonding three sides of one film or sheet to respective three sides of the other film or sheet. As the covering member 22 having four closed sides, for example, there may be mentioned a covering member formed by folding a sheet-shaped film or sheet in a longitudinal direction so that end portions thereof are overlapped with each other, followed by bonding three sides of one part of the folded film or sheet to respective three sides of the other part of the folded film or sheet, or a covering member formed by overlapping two rectangular films or sheets followed by bonding four sides of one film or sheet to respective four sides of the other film or sheet. In addition, hereinafter, among the surfaces of the covering member 22, a surface at the optical element stack 21 side is called an inner surface, and a surface opposite thereto is called an outer surface. In addition, in the covering member 22, a region at a side of the light incident surface on which light is incident from the lighting element 1 is called a first region R1, and a region at a side of the light transmission surface from which light incident from the lighting element 1 is emitted to the liquid crystal panel 4 is called a second region R2.

The thickness of the covering member 22 is, for example, in the range of 5 to 5,000 µm. It is preferably 10 to 500 µm and more preferably 15 to 300 µm. When the thickness of the covering member 22 is large, for example, a decrease in luminance and/or non-uniform shrinkage of a heat welded portion (sealed portion) of the covering member 22 may occur. In addition, due to degradation in adhesion with the optical element stack 21, for example, wrinkles are generated in the covering member 22; hence, when it is mounted in an actual apparatus, deformation occurs, resulting in degradation in image quality. In addition, the thicknesses of the covering member 22 at the incident surface side and at the transmission surface side may be made different from each other. In addition, in view of rigidity, the covering member 22 may include a support medium.

When the covering member 22 has the anisotropy, the optical anisotropy thereof is preferably small. In particular, the retardation thereof is preferably 50 nm or less and more preferably 20 nm or less. As the covering member 22, a uniaxially or a biaxially drawn sheet or film is preferably used. When the sheet or the film as described above is used, since the covering member 22 may be allowed to shrink in the drawing direction by heat application, the adhesion between the covering member 22 and the optical element stack 21 can be improved.

The covering member 22 is preferably formed to have shrinkable properties. The heat shrinkable properties can be obtained by re-heating the covering member 22 which is processed beforehand by drawing with heat application. Alternatively, after the end surfaces of the covering member 22 are stretched, and the support medium 23 and the optical element 24, which are the inclusions, are covered therewith, when the end portions are welded together by heat sealing, the covering member 22 may be allowed to shrink by its stretchability so as to cover the intrusions.

Figure 2:
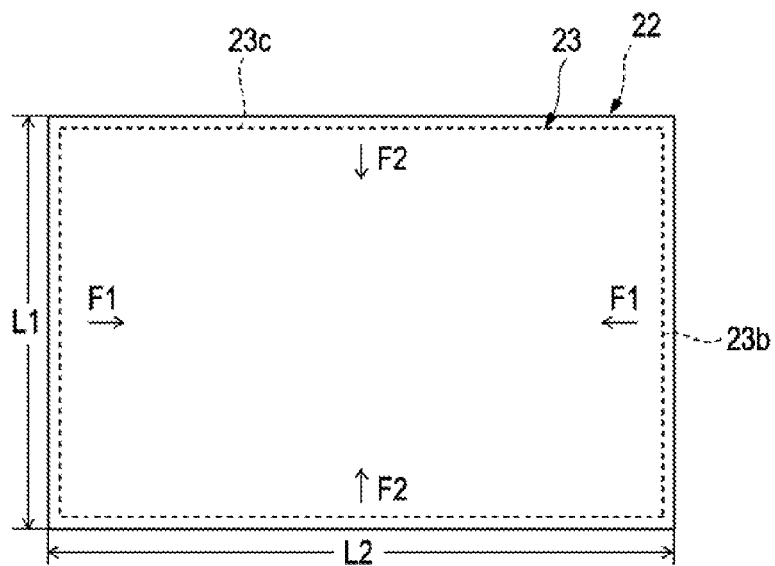
FIG. 2 is a schematic plan view showing the relationship between one side of a support medium and a tensile force F of a covering member acting in a direction perpendicular to this side.

FIG. 2 is a schematic plan view showing the relationship between each side of the support medium 23 and a tensile force F of the covering member 22 acting in the direction perpendicular thereto. The support medium 23 has a rectangular primary surface. The rectangular primary surface is formed of first sides 23b facing each other and second sides 23c being perpendicular thereto and facing each other. A thickness t of the support medium 23, lengths L1 and L2 of the first side 23b and the second side 23c, respectively, of the support medium 23, and tensile forces F2 and F1 of the covering member acting parallel to the first side 23b and the second side 23c, respectively, satisfy the following equations (2) and (3) at a temperature of 70° C.

$$0 \leq F1 \leq 1.65 \times 10^4 \times t/L2 \quad (2)$$

$$0 \leq F2 \leq 1.65 \times 10^4 \times t/L1 \quad (3)$$

Figure 14:
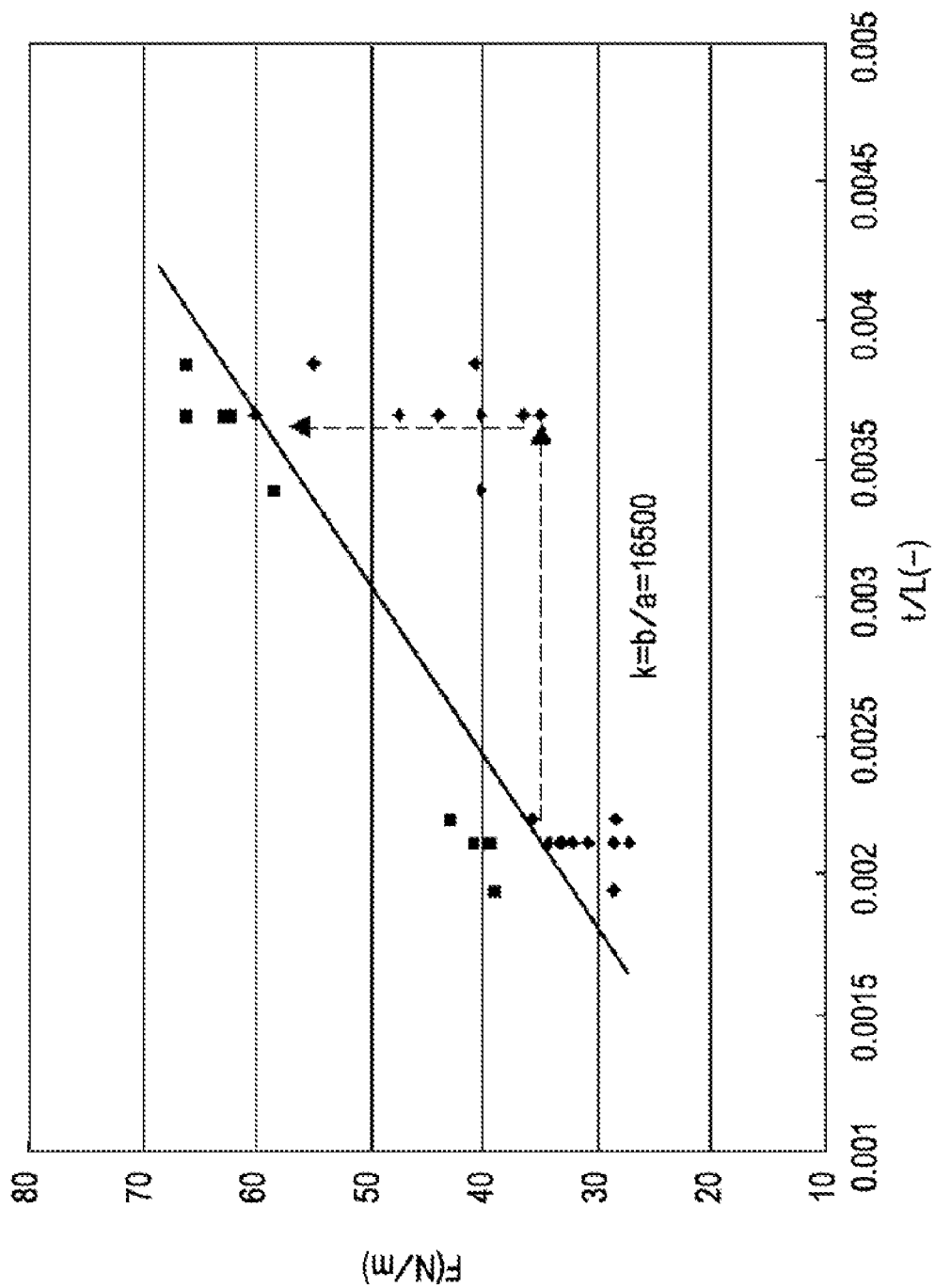
FIG. 14 is a graph showing the relationship between the tensile force and a ratio t/L of a sample.
Figure 15:
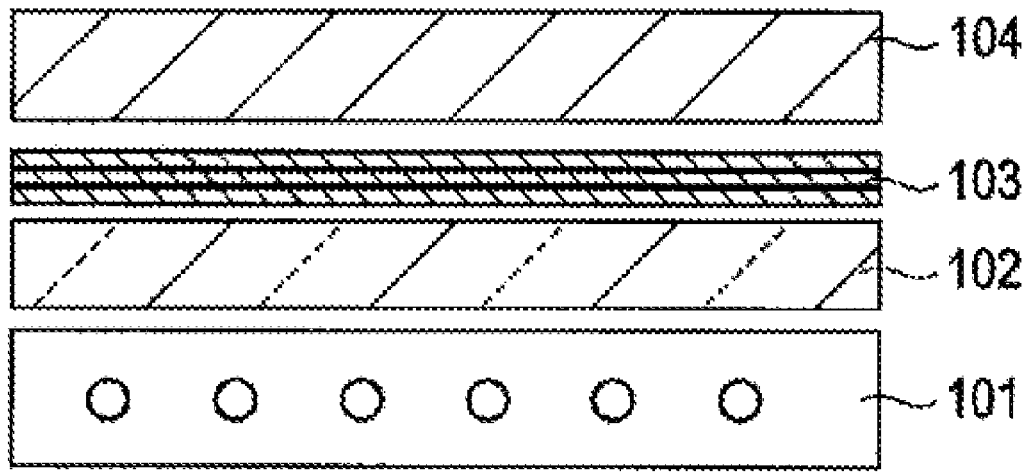
FIG. 15 is a schematic view showing the structure of a liquid crystal display device of a related art.

With reference to FIG. 14, the relationship of the tensile force parallel to the first side 23b with the ratio of the thickness t of the support medium 23 to the length L1 of the first side 23b and the relationship of the tensile force parallel to the second side 23c with the ratio of the thickness t of the support medium 23 to the length L2 of the second side 23c will be described. From FIG. 14, it is understood that by the slope of the tensile force to the ratio of the thickness t of the support medium to the length L of the first side or the second side, a high tensile force region in which warping causes a defect and a tensile force region in which no warping occurs are separated from each other. From this relationship, it is understood that the tensile force F1 or F2 is inversely proportional to the length of the side parallel to this tensile-force direction, so that as the long-side length is increased, a tensile force which is liable to generate warping may be decreased, and as the short-side length is decreased, a tensile force which is liable to generate warping can be increased. From the relationships described above, by the thickness t and the shape of the support medium 23, a tensile force which generates no warping can be understood, and as a result, degradation in image quality caused by warping can be suppressed.

Figure 3A:
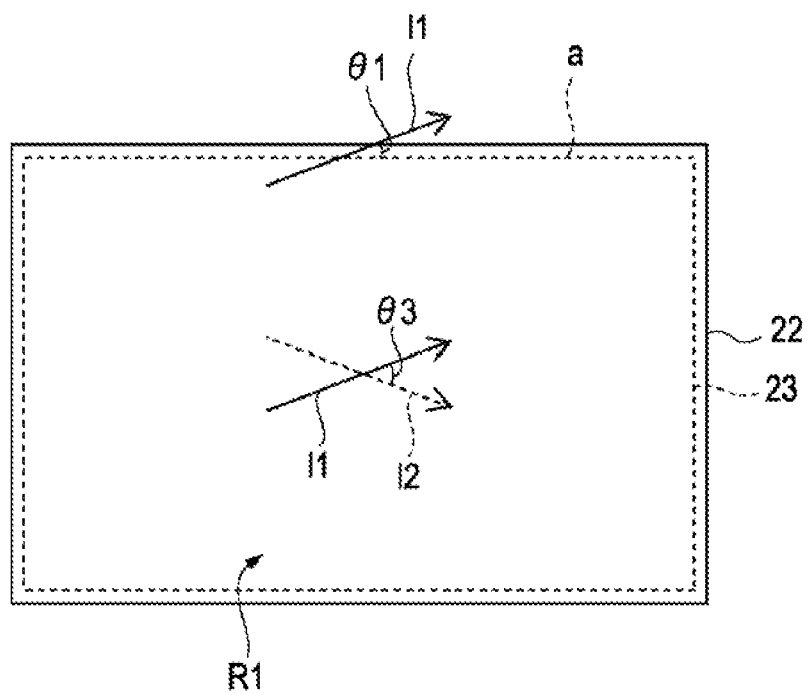
FIG. 3A is a schematic plan view showing an orientation axis direction of a covering member in a first region.
Figure 3B:
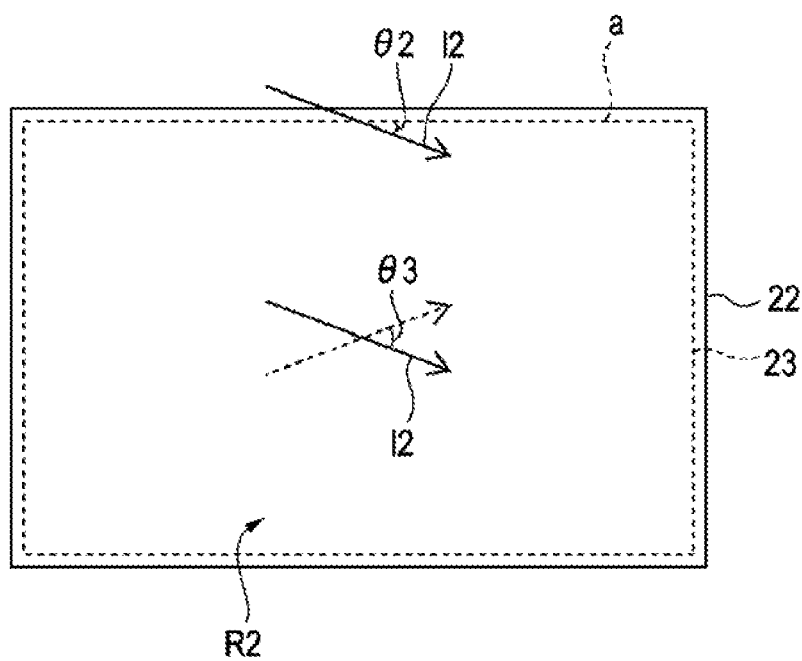
FIG. 3B is a schematic plan view showing an orientation axis direction of the covering member in a second region.

FIG. 3A shows an orientation axis direction of the covering member 22 in the first region R1. FIG. 3B shows an orientation axis direction of the covering member 22 in the second region R2. The covering member 22 has orientation axes 11 and 12 in the first region R1 and the second region R2, respectively. The orientation axis 11 in the first region R1 and a side surface a of the support medium 23 form an angle θ1. The second orientation axis 12 in the second region R2 and the side surface a of the support medium 23 form an angle θ2. The angles θ1 and θ2 thus formed are each preferably 8° or less and more preferably 3.5° or less. When the angles θ1 and θ2 are each more than the above value, since the shrinkable properties of the covering member 22 are not uniform, the covering member 22 is not allowed to sufficiently shrink, and sags and/or wrinkles are generated; as a result, as a surface light source, luminance irregularities are generated, and the image quality of a liquid crystal display device is degraded.

In addition, the orientation axis 11 of the covering member 22 in the first region R1 and the orientation axis 12 thereof in the second region R2 form an angle θ3. The angle θ3 thus formed is preferably 16° or less and more preferably 7° or less. When the angle θ3 is more than the above value, since the shrinkable properties of the covering member 22 are not uniform, the covering member 22 is not allowed to sufficiently shrink, and sags and/or wrinkles are generated; as a result, as a surface light source, luminance irregularities are generated, and the image quality of a liquid crystal display device is degraded.

In the case in which the covering member 22 is formed of a transparent resin material, as a measurement method of the orientation axis, for example, there may be used a method using retardation measurement in which the slope obtained by applying a polarized wave to a test piece or the like, which is cut from the covering member 22, is measured, and a measurement method which is performed, for example, by a molecular orientation meter using a transmission microwave.

In addition, as a method for changing the angle between the long side and the orientation axis of a film, a method can be used in which the long side direction of a film is rotated by an arbitrary angle, followed by cutting the film, and after a support medium and an optical element are covered with the cut film, the end portions thereof are heat-sealed so as to allow the film to heat-shrink. Alternatively, since the orientation axis of a central portion of an original film is different from that of each of two end portions thereof, the above angle can be changed in accordance with a place from which a shrinkable film is obtained. For example, when a shrinkable film is obtained from the central portion of the original film, and the orientation axis and the axis of the shrinkable film are set approximately parallel to each other, the difference between the long side direction and the orientation axis of the film can be decreased, and they are likely to be aligned. On the other hand, when a shrinkable film is obtained from the end portion of the original film, the difference between the long side direction and the orientation axis is increased, and when members to be covered are simply placed parallel to the long side direction of the film, the orientation axis is largely different therefrom. In order to avoid the above difference, when the members to be covered are placed parallel to the orientation axis, and the end portions of the film are heat-sealed so as to allow the film to heat-shrink, the difference can be decreased.

As a material for the covering member 22, a high molecular weight material having heat shrinkable properties is preferably used, and since an internal temperature of a liquid crystal display device or the like reaches up to approximately 70° C., a high molecular weight material which is shrinkable by heat application in the range of room temperature to 85° C. is more preferably used. The material is not particularly limited as long as it satisfies the above properties, and in particular, for example, polystyrene (PS), a copolymer of polystyrene and butadiene, polypropylene (PP), polyethylene (PE), polycarbonate (PC), a polyester resin, such as poly(ethylene naphthalate) (PEN) or un-oriented poly(ethylene terephthalate) (PET), a vinyl based resin, such as poly(vinyl alcohol), a cycloolefinic resin, a urethane-based resin, a vinyl chloride-based resin, a natural rubber-based resin, and an artificial rubber-based resin may be used alone or in combination.

The heat shrinkage rate of the covering member 22 may be preferably selected in consideration of the sizes and materials of the support medium 23 and the optical element 24 to be covered, usage circumstances of the optical element stack 21, and the like. In particular, the shrinkage rate at 85° C. is preferably 0.2% to 100%, more preferably 0.5% to 20%, and even more preferably 0.5% to 10%. When the shrinkage rate is less than 0.2%, the adhesion between the covering member 22 and the optical element 24 may be degraded in some cases, and when the shrinkage rate is more than 100%, since the heat shrinkable properties become non-uniform in the plane, the optical element may be forced to shrink in some cases. The heat distortion temperature of the covering member 22 is preferably 85° C. or more. The reason for this is that degradation in optical properties of the optical element covering member 2 caused by heat generated from the light source 11 can be suppressed. The drying loss of the material for the covering member 22 is preferably 2% or less. The refractive index of the material for the covering member 22 (refractive index of the covering member 22) is preferably 1.6 or less and more preferably 1.55 or less. However, when an optical functional layer is provided on the covering member 22 by forming or transferring a shape, since the effect of the functional layer becomes significant as the refractive index is increased, the refractive index is preferably 1.5 or more, more preferably 1.57 or more, and most preferably 1.6 or more, and in consideration of each functional layer, the refractive index thereof is desirably set in a preferable range. The reason for this is that the optical effect becomes significant as the refractive index is increased, and for example, a light condensation effect, a diffusion effect, and the like can be improved.

The covering member 22 preferably contains at least one type of filler. The reasons for this are that when the optical element covering members are stacked to each other, they are prevented from adhering to each other, and that the covering member 22 and the inclusion member are prevented from adhering to each other due to excessively increased adhesion therebetween. As the filler, for example, at least one type of organic filler and inorganic filler may be used. As a material for the organic filler, for example, at least one of an acrylic resin, a styrene resin, a fluorinated resin, and a hollow resin may be used. As the inorganic filler, for example, at least one type of silica, alumina, talc, titanium oxide, and barium sulfate may be used. As the shape of the filler, for example, various shapes, such as a needle, a sphere, an oval, a plate, and a scale, may be used. As the diameter of the filler, for example, at least one diameter may be selected.

In addition, instead of the filler, the surface may be processed to have a specific shape. As a method for forming the shape, for example, there may be mentioned a method in which when a shrinkable film or sheet forming the covering member 22 is formed, an arbitrary diffusive shape is transferred on the surface thereof, and a method in which after a film or a sheet is formed, an arbitrary diffusive shape is transferred on the surface thereof by applying heat and/or pressure.

In addition, whenever necessary, the covering member 22 may further contain additives, such as a light stabilizer, a UV absorber, an antistatic agent, a flame retardant, and an antioxidant, so as to obtain a UV absorption function, an IR absorption function, an antistatic function, and the like. In addition, by performing a surface treatment, such as an antireflection treatment (AR treatment) and/or an antiglare treatment (AG treatment) on the covering member 22, the reflection light may be diffused, and/or the reflection light itself may be decreased. Furthermore, a function to transmit light in a specific wavelength region, such as UV-A light (approximately 315 to 400 nm), may be imparted to the covering member 22.

The liquid crystal panel 4 is a panel to control light supplied from the light source 11 and to display information. As the liquid crystal panel 4, for example, there may be used panels having various display modes, such as a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

Next, with reference to FIGS. 4 to 6, structural examples of the optical element covering member 2 will be described in detail.

Figure 4:
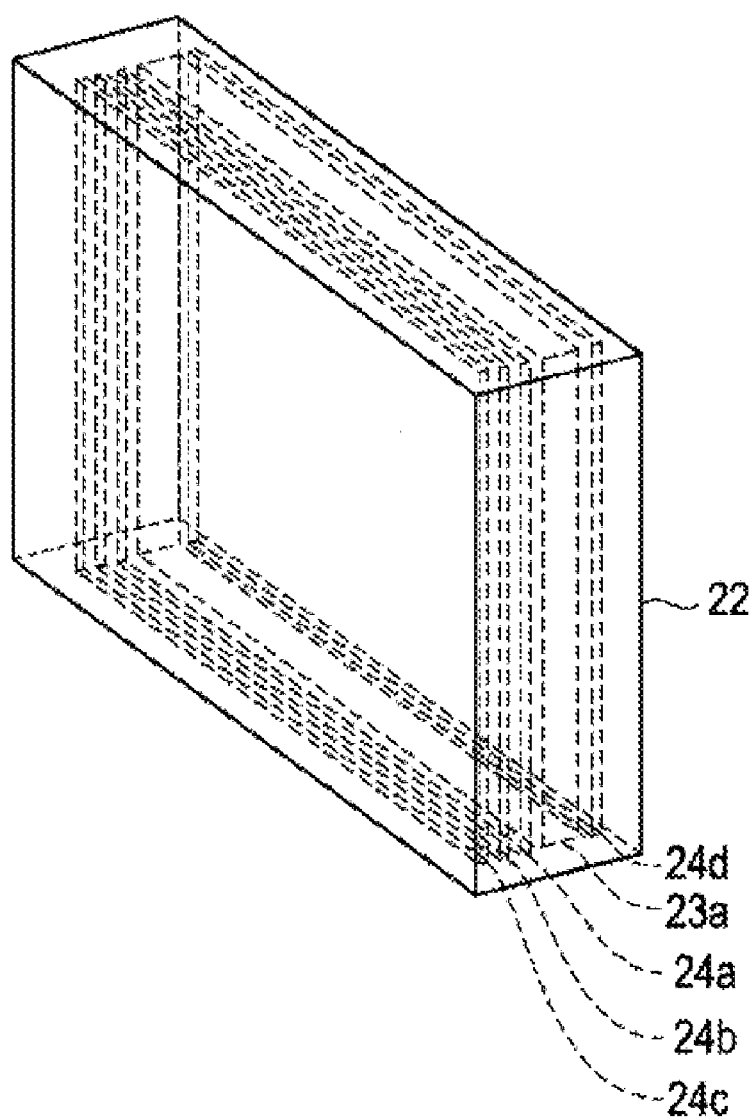
FIG. 4 is a schematic cross-sectional view showing one structural example of an optical element covering member according to the first embodiment.

FIG. 4 shows one structural example of an optical element covering member according to the first embodiment. As shown in FIG. 4, the optical element covering member 2 includes, for example, a diffusion plate 23a used as a support medium, a diffusion film 24a, a lens film 24b, a reflection type polarizer 24c, and a light control film 24d, the latter four each being used as an optical element, and also includes the covering member 22 which covers those described above and units them together. In this embodiment, the diffusion plate 23a, the diffusion film 24a, the lens film 24b, the reflection type polarizer 24c, and the light control film 24d form the optical element stack 21. The primary surfaces of the optical element stack 21 each have, for example, a rectangular shape in which the ratio of the longitudinal length to the lateral length is not 1. The covering member 22 has, for example, a bag shape, and all six surfaces of the optical element stack 21 are covered with this covering member 22. The covering member 22 is bonded by heat welding at an end surface of the optical element stack 21.

The diffusion plate 23a is provided above the at least one light source 11 and is a plate to uniform the luminance by diffusing light emitted from the at least one light source 11 and reflection light reflected from the reflection plate 12. As the diffusion plate 23a, for example, there may be used a plate having an irregular structure on the surface thereof to diffuse light, a plate which includes fine particles having a different refractive index from that of a primary structural material for the diffusion plate 23a, a plate including hollow fine particles, or a plate including at least two of the above irregular structure, fine particles, and hollow fine particles in combination. As the fine particles, for example, at least one type of organic filler and inorganic filler may be used. In addition, the above irregular structure, fine particles, and hollow fine particles may be provided, for example, in the transmission surface of the diffusion plate 23a. The light transmittance of the diffusion plate 23a is, for example, 30% or more.

The diffusion film 24a is provided on the diffusion plate 23a and is a film, for example, to further diffuse the light diffused by the diffusion plate 23a. As the diffusion film 24a, for example, there may be used a film having an irregular structure on the surface thereof to diffuse light, a film which includes fine particles having a different refractive index from that of the primary structural material for the diffusion film 24a, a film including hollow fine particles, or a film including at least two of the above irregular structure, fine particles, and hollow fine particles in combination. As the fine particles, for example, at least one type of organic filler and inorganic filler may be used. In addition, the above irregular structure, fine particles, and hollow fine particles are provided, for example, in the transmission surface of the diffusion film 24a.

The lens film 24b is provided on the diffusion film 24a and is a film, for example, to improve the directivity of irradiated light. On the transmission surface of the lens film 24b, for example, lines of fine prisms or lenses are provided, the cross-section of this prism or lens in the line direction has, for example, an approximately triangle shape, and the peak thereof preferably has a round shape. The reasons for this are that the cut-off can be improved and a wide viewing angle can also be improved.

The light control film 24d includes an optical functional layer having an irregular structure on at least one of an emission surface and a transmission surface and is provided to control light source irregularities of CCFL or LED. For example, a continuous shape of prisms, circular arcs, hyperboloids, or paraboloids; a single shape thereof; or a shape in combination thereof may be used, and in some cases, a structure having a flat surface or a film such as the diffusion film 24a may be provided.

The diffusion film 24a and the lens film 24b are each formed, for example, of a high molecular weight material, and the refractive index thereof is, for example, 1.5 to 1.6. As a material forming the optical element 24 or the optical functional layer provided therefor, for example, a thermoplastic resin, a photosensitive resin which is cured by light rays or electron beams, a thermosetting resin which is cured by heat, or a UV curable resin which is cured by ultraviolet rays is preferable.

The reflection type polarizer 24c is provided on the lens film 24b and is a polarizer which transmits only one of two polarized components of light perpendicular to each other, the directivity thereof being enhanced by the lens film 24b, and which reflects the other polarized component. The reflection type polarizer 24c is a stack composed, for example, of an organic multilayer film, an inorganic multilayer film, or a liquid-crystal multilayer film. In addition, the reflection type polarizer 24c may include a different refractive index material. In addition, the reflection type polarizer 24c may be provided with a diffusion layer or lens.

Figure 5:
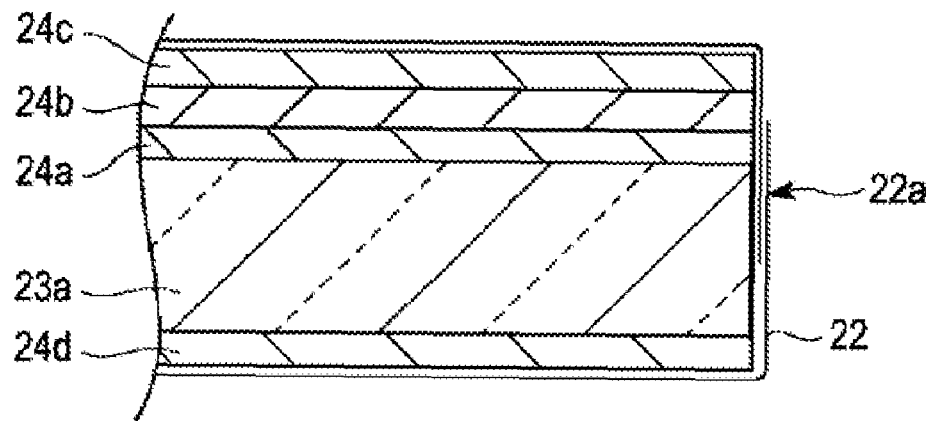
FIG. 5 is a schematic cross-sectional view showing a first example of a bond portion of the covering member.
Figure 6:
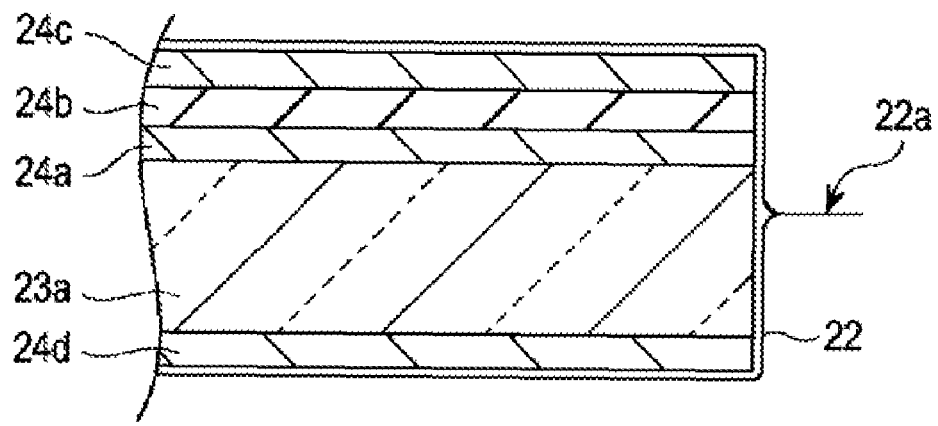
FIG. 6 is a schematic cross-sectional view showing a second example of the bond portion of the covering member.

With reference to FIGS. 5 and 6, an example of a bond portion of the covering member 22 will be described.

FIG. 5 shows a first example of a bond portion 22a of the covering member. According to this first example, as shown in FIG. 5, an inside surface and an outside surface of the edge portions of the covering member are bonded to each other on one end surface of the optical element stack 21 so as to be overlapped with each other. That is, the edge portions of the covering member 22 are bonded together so as to be along the end surface of the optical element stack 21.

FIG. 6 shows a second example of the bond portion 22a of the covering member. According to this second example, as shown in FIG. 6, inside surfaces of the edge portions of the covering member are bonded to each other at one end surface of the optical element stack 21 so as to be overlapped with each other. That is, the edge portions of the covering member 22 are bonded together so as to be erected from the end surface of the optical element stack 21.

(1-2) Method for Manufacturing Optical Element Covering Member

Next, one example of a method for manufacturing the optical element covering member 2 having the above structure will be described. First, the diffusion plate 23a, the diffusion film 24a, the lens film 24b, and the reflection type polarizer 24c are placed in that order on the light control film 24d, so that the optical element stack 21 is obtained, Next, an original film having heat shrinkable properties is prepared, and from this original film, two rectangular films are obtained by cutting. In this step, the long side of the rectangular film and the orientation axis thereof preferably form an angle of 8° or less.

Next, the two films are overlapped with each other, and two or three sides of one film are then heat welded to respective sides of the other film, so that the covering member 22 is formed to have a bag shape. Alternatively, the bag-shaped covering member 22 may also be formed by sandwiching the optical element stack 21 between two films followed by heat welding of at least two edge sides of one film to the respective edge sides of the other film. In this step, the two films are preferably overlapped so that the orientation axes thereof form an angle of 16° or less. Alternatively, the optical element covering member 2 may also be obtained such that after the optical element stack 21 is sandwiched between two parts of a folded film, at least two sets of sides, which face each other, of the two parts of the folded film are heat welded for sealing the covering member 22, or such that after the optical element stack 21 is placed between two films, at least two sets of sides, which face each other, of the two films are heat welded for sealing the covering member 22. In another way, after the optical element stack 21 is inserted in the covering member 22 from an open side thereof which is not welded, the open side is heat welded so as to seal the covering member 22, thereby obtaining the optical element covering member 2.

Next, the optical element covering member 2 is transported to an oven or the like, and the covering member 22 is allowed to shrink under high temperature conditions.

As a result, a targeted optical element covering member can be obtained.

According to this first embodiment, since the optical elements 24 and the support medium 23 are covered with the covering member 22, while an increase in thickness of the optical element is suppressed, insufficient rigidity thereof can be improved.

(2) Second Embodiment

Figure 7A:
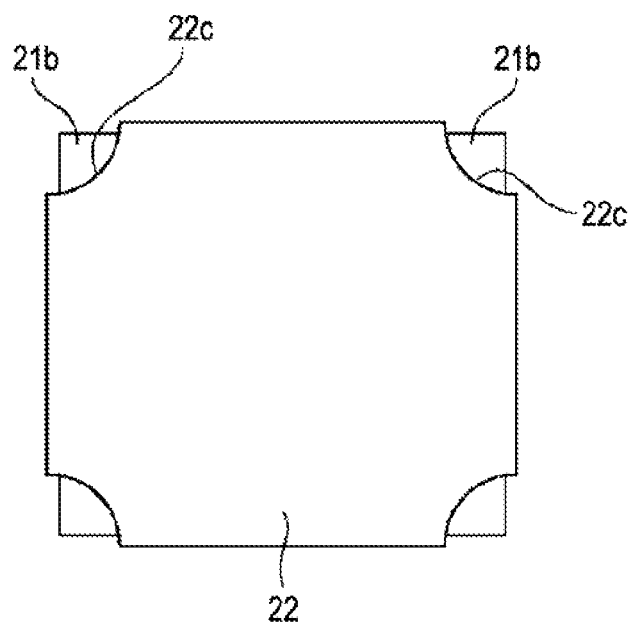
FIG. 7A is a plan view showing one structural example of an optical element covering member according to a second embodiment.
Figure 7B:
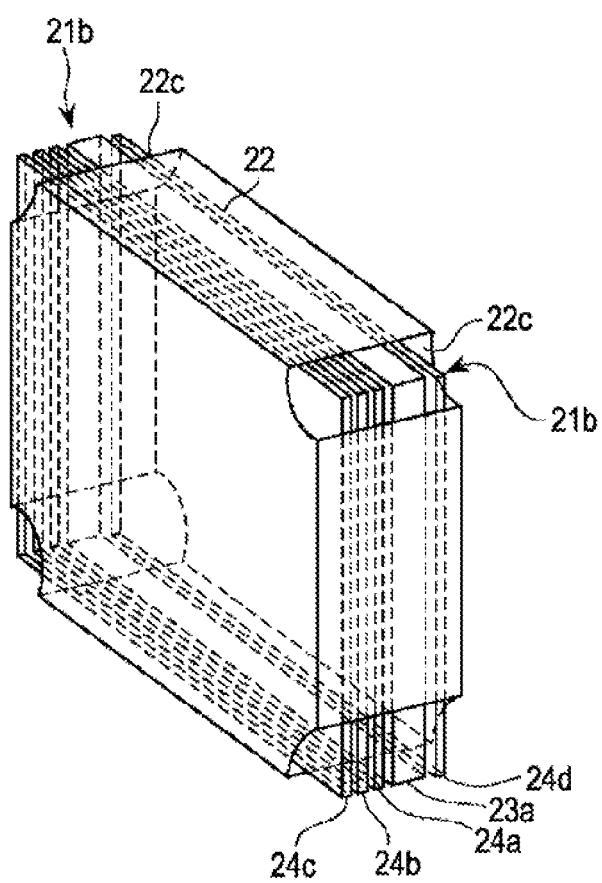
FIG. 7B is a perspective view showing one structural example of the optical element covering member according to the second embodiment.

FIGS. 7A and 7B show one structural example of an optical element covering member according to the second embodiment. In this second embodiment, at least one opening portion 22c is provided in the covering member 22 of the first embodiment. The opening portion 22c is provided at a position corresponding to at least one of corner portions 21b of the optical element stack 21.

In this second embodiment, since the at least one opening portion 22c is provided in the covering member 22, when the covering member 22 shrinks in a step of forming the optical element covering member 2, air inside the covering member 22 can be removed from the opening portion 22c. Hence, the covering member 22 can be suppressed, for example, from swelling. The reason the opening portion 22c is provided is that in the case in which the covering member 22 swells, deformation thereof occurs when the optical element covering member 2 is mounted in an actual apparatus, and as a result, the image quality is degraded. In addition, the covering member 22 can also be suppressed from being broken. Furthermore, the opening portion 22c functions as an outlet for air during heat shrinking, and when the covering member 22 is mounted in a liquid crystal display device, the opening portion 22c can also function as an outlet for air expanded by heat and as an outlet for air and the like generated from the optical element stack 21.

(3) Third Embodiment

Figure 8:
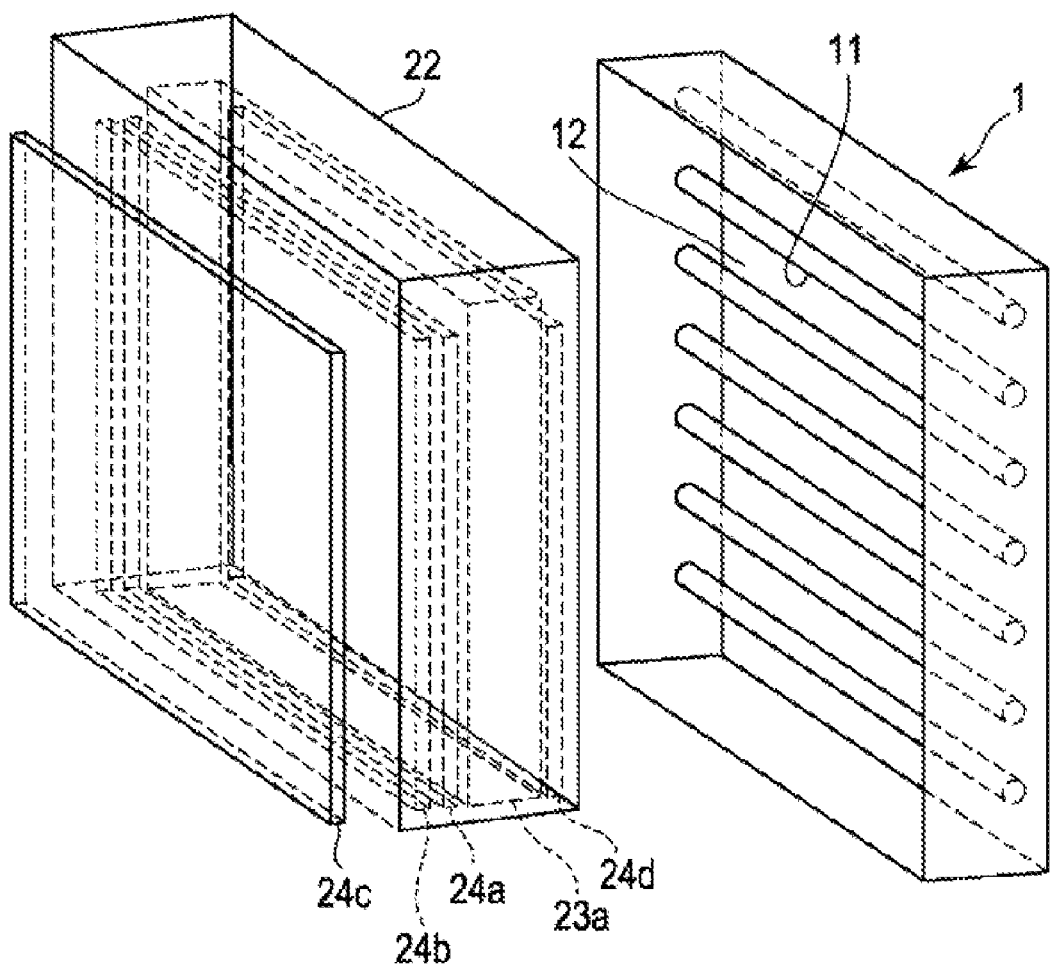
FIG. 8 is a perspective view showing one structural example of a backlight according to a third embodiment.

FIG. 8 shows one structural example of a backlight according to the third embodiment. According to the third embodiment, instead of the reflection type polarizer 24c disposed directly under the second region R2 of the covering member 22, according to the first embodiment, the lens film 24b, such as a prism sheet, is disposed.

The lens film 24b is one type of optical element having a pattern on a surface of a transparent substrate. As the optimum pattern formed on the surface, a triangle shape is preferable. By a prism pattern formed on this film, light emitted from the light source 11 is condensed by reflection and refraction. The lens film 24b used in the third embodiment is not particularly limited; however, for example, BEF manufactured by Sumitomo 3M Limited may be used.

In addition, in order to reduce the glare of the lens film 24b, the diffusivity is preferably included to a certain extent in the second region R2 of the covering member 22.

As shown in FIG. 8, from the lighting element 1 to the liquid crystal panel 4, for example, the optical element covering member 2 and the reflection type polarizer 24c, which is an optical element, are provided in that order. The light control film 24d, the diffusion plate 23a, the diffusion film 24a, and the lens film 24b are covered with the covering member 22 and are united together, so that the optical element covering member 2 is formed.

(4) Fourth Embodiment

In this fourth embodiment, an optical element function is provided to the covering member 22 of the first embodiment. The covering member 22 is provided with an optical functional layer on at least one of the first region R1 and the second region R2. The optical functional layer is provided, for example, on at least one of the inner surface and the outer surface of the covering member 22. The optical functional layer is a layer which performs a predetermined treatment for light incident from the lighting element 1 to improve it to have desired properties. As the optical functional layer, for example, a diffusion functional layer having a function of diffusing incident light, a light condensation functional layer having a function of condensing light, and a light source division functional layer having the function of the light control film 24d described above may be mentioned. In particular, for example, in the optical functional layer, surface structured members, such as a cylindrical lens, a prism lens, or a fly-eye lens, are disposed. In addition, a wobble may be provided for the surface structured member, such as a cylindrical lens or a prism lens. As the optical functional layer, for example, an ultraviolet cut functional layer (UV cut functional layer) which cuts ultraviolet rays or an infrared cut functional layer (IR cut functional layer) which cuts infrared rays may be used.

As a method for forming an optical functional layer of the covering member 22, for example, the following methods may be mentioned. That is, there are a method for forming a functional layer having diffusivity by applying a resin material on the covering member 22, followed by drying; a method in which when a film or a sheet for the covering member 22 is formed, a single-layer or a multilayer structural film or sheet is formed by extrusion or co-extrusion molding so that particles having diffusivity are contained in a resin material or so that voids are formed therein; a method for forming a diffusive functional layer, a condensation functional layer, such as a lens, or a light source division functional layer having an arbitrary shape by transferring a predetermined shape to a resin material such as a UV curable resin; a method in which a predetermined shape, which is prepared beforehand in consideration of the shrinkage rate, is transferred when a shrinkable film is formed, and shrinkable properties are imparted thereto by drawing; a method in which after a shrinkable film is formed, the above functional layer is transferred thereon by applying heat and pressure; and a method for forming minute holes in a film by a mechanical process or a thermal process using laser or the like.

Figure 9:
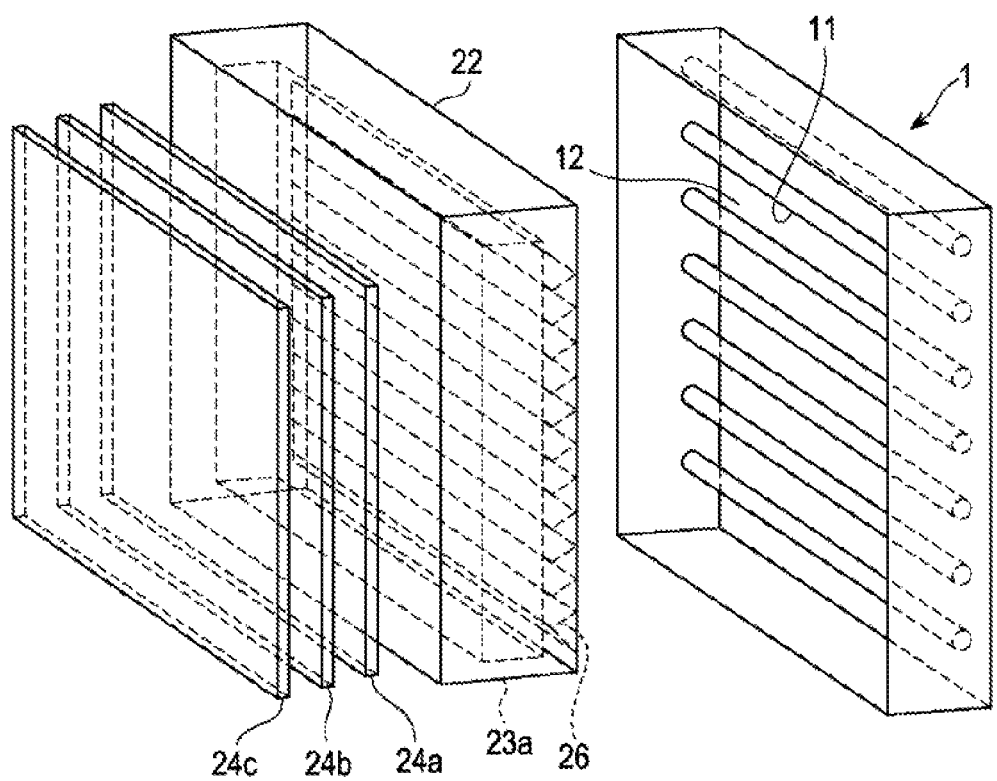
FIG. 9 is a perspective view showing one structural example of a backlight according to a fourth embodiment.

FIG. 9 shows one structural example of a backlight according to a fourth embodiment. As shown in FIG. 8, from the lighting element 1 to the liquid crystal panel 4, for example, the diffusion plate 23a, the diffusion film 24a, the lens film 24b, the reflection type polarizer 24c, and the light control film 24d are provided in that order. In addition, the diffusion plate 23a is covered with the covering member 22, and on a part of the inner surface of the covering member 22, which is located at the incident side, a surface structured member 26 having brightness-irregularity-reducing function is provided.

In this fourth embodiment, since the surface structured member and the optical functional layer are provided on at least one of the inner surface and the outer surface of the covering member 22, the number of optical elements covered with the covering member 22 can be decreased. Hence, the thickness of the optical element covering member 2 and that of the liquid crystal display device can be further decreased.

(5) Fifth Embodiment

The covering member 22 has, for example, a belt shape, and end surfaces thereof in the longitudinal direction are boded to each other preferably on an end surface of the optical element stack 21. Alternatively, the covering member 22 has an open-ended tubular shape having no bond portion. Hereinafter, in the case in which the primary surface of the optical element stack 21 has a rectangular shape in which the ratio of the longitudinal length to the lateral length is not 1, the structure of the optical element covering member 2 will be described.

Figure 10:
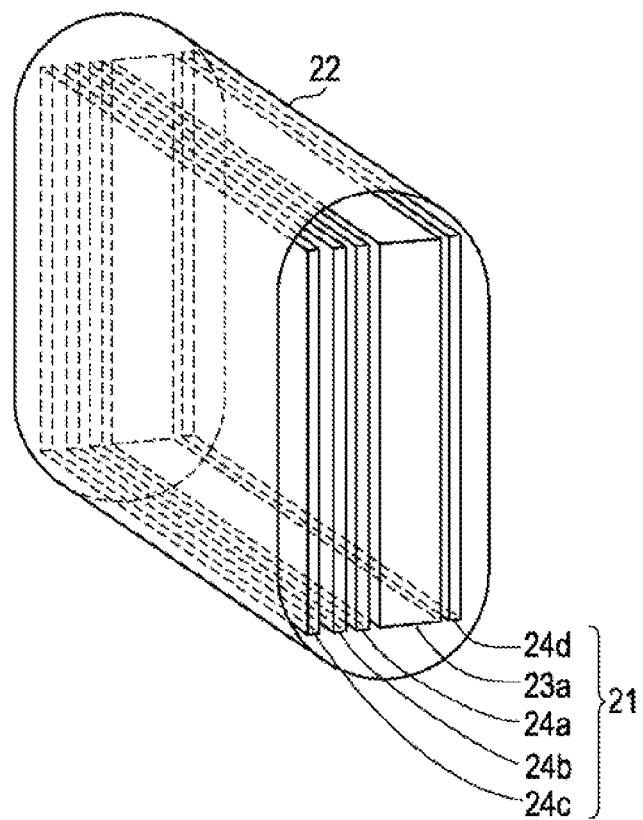
FIG. 10 is a perspective view showing a first structural example of an optical element covering member according to a fifth embodiment.

FIG. 10 shows a first structural example of an optical element covering member of the fifth embodiment. As shown in FIG. 10, the incident surface, the transmission surface, and two end surfaces along the long side of the optical element stack 21 are covered with the covering member 22 having a belt shape, and the two end surfaces along the short side of the optical element stack 21 are exposed. The two end portions of the sheet-shaped covering member 22 in the longitudinal direction are bonded to each other, for example, on the end surface at the long side of the optical element stack 21.

Figure 11:
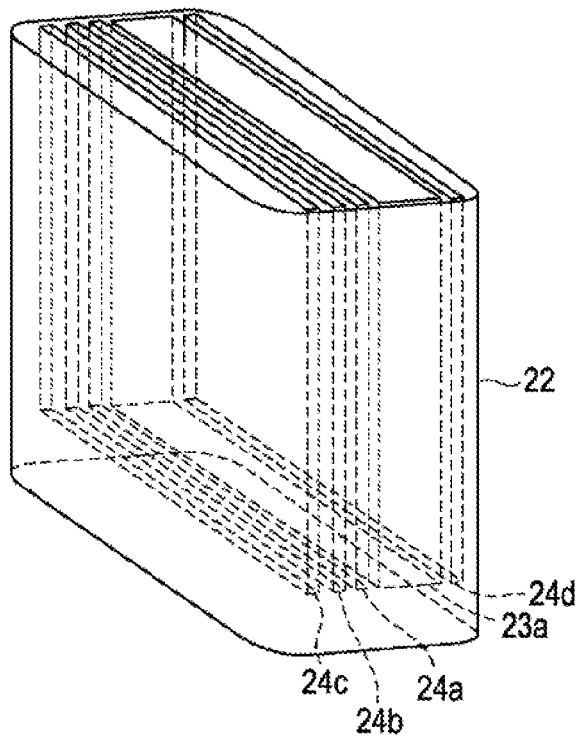
FIG. 11 is a perspective view showing a second structural example of the optical element covering member according to the fifth embodiment.

FIG. 11 shows a second structural example of the optical element covering member of the fifth embodiment. As shown in FIG. 11, the incident surface, the transmission surface, and two end surfaces along the short side of the optical element stack 21 are covered with the covering member 22 having a belt shape, and the two end surfaces along the long side of the optical element stack 21 are exposed. The two end portions of the sheet-shaped covering member 22 in the longitudinal direction are bonded to each other, for example, on the end surface at the short side of the optical element stack 21.

Figure 12:
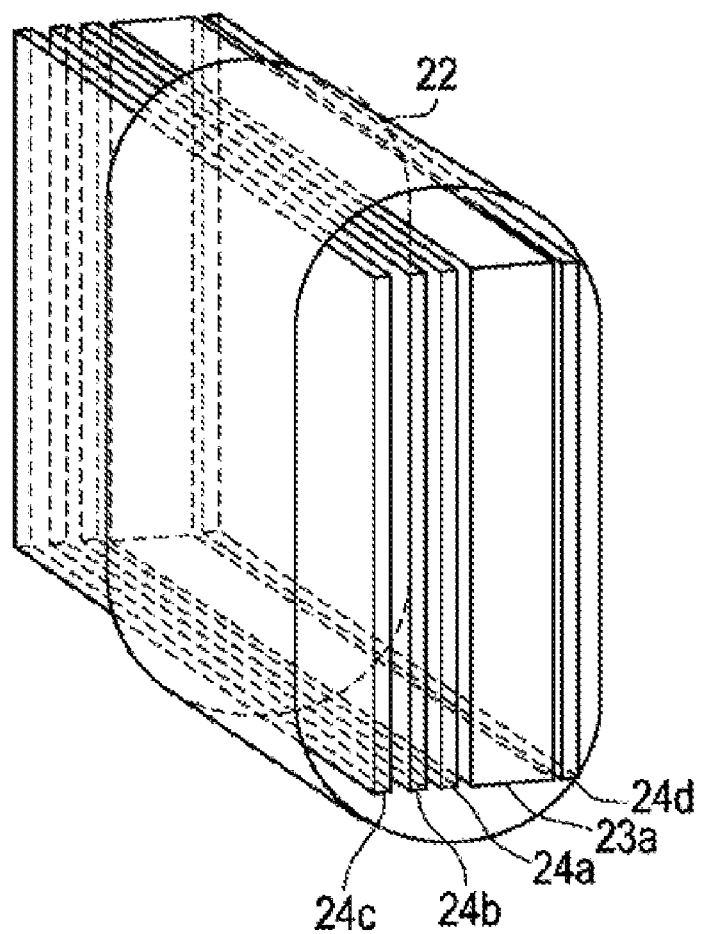
FIG. 12 is a perspective view showing a third structural example of the optical element covering member according to the fifth embodiment.

FIG. 12 shows a third structural example of the optical element covering member of the fifth embodiment. As shown in FIG. 12, the central portion of the optical element stack 21 and the vicinity thereof are covered with the covering member 22 having a belt shape, and the two end portions at the short side of the optical element stack 21 are exposed. The two end portions of the sheet-shaped covering member 22 in the longitudinal direction are bonded to each other, for example, on the end surface at the long side of the optical element stack 21.

Figure 13A:
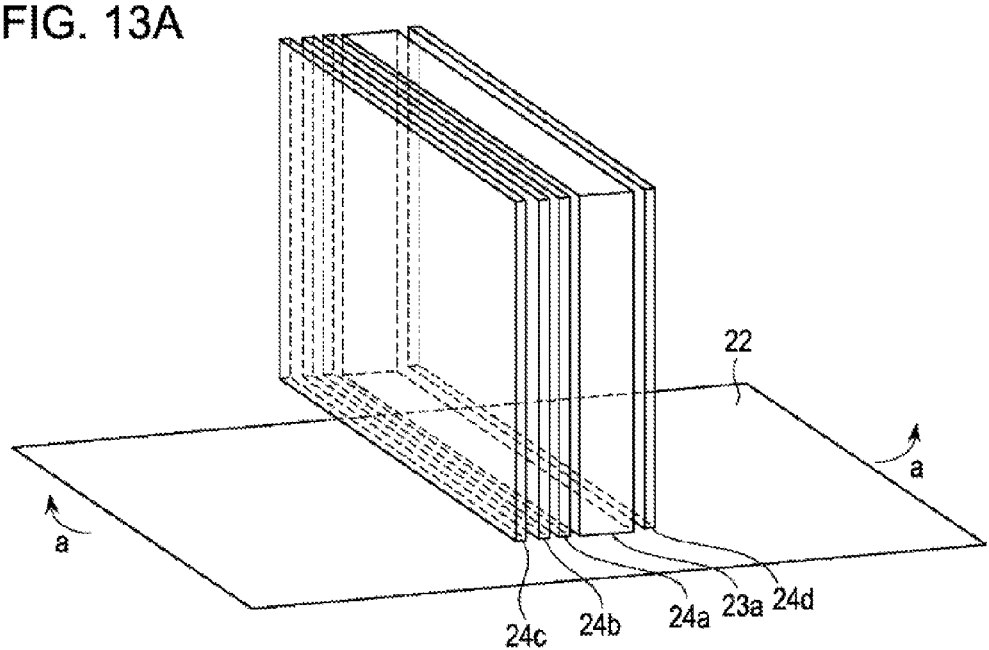
FIGS. 13A and 13B each show a step of a method for manufacturing the optical element covering member according to the fifth embodiment.
Figure 13B:
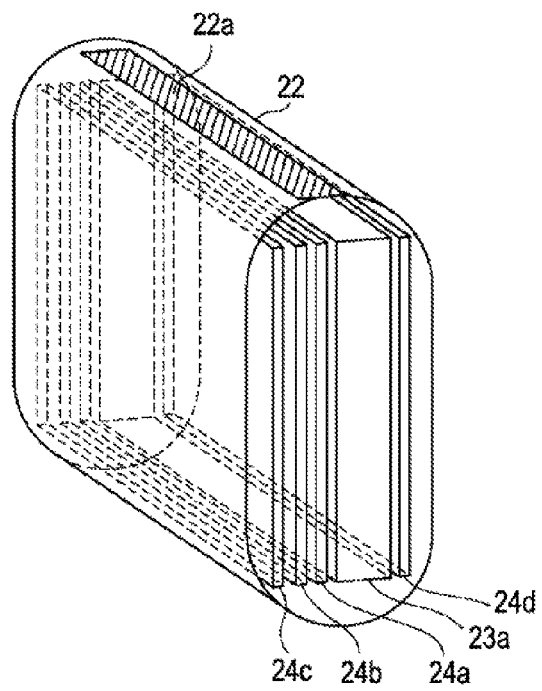

Next, one example of a method for manufacturing the optical element covering member 2 having the structure described above will be described. First, as shown in FIG. 13A, the at least one optical element 24 and the support medium 23 stacked thereon are placed, for example, on the sheet-shaped covering member 22. Next, as shown by arrows a in FIG. 13A, for example, the two end portions of the sheet-shaped covering member 22 in the longitudinal direction are pulled up, so that the at least one optical element 24 and the support medium 23 stacked thereon are covered with the covering member 22. Subsequently, as shown in FIG. 13B, for example, the end portions of the covering member 22 in the longitudinal direction are boned to each other on the end surface of the at least one optical element 24 or that of the support medium 23. As a bonding method, for example, adhesion using an adhesive or by welding may be mentioned. As the adhesion method using an adhesive, for example, a hot melt type adhesion method, a thermosetting type adhesion method, a pressure-sensitive (tacky adhesive) type adhesion method, an energy ray curing adhesion method, or a hydration adhesion method may be mentioned. As the adhesion method by welding, for example, heat welding, ultrasonic welding, or laser welding may be mentioned. Subsequently, whenever necessary, by applying heat to the covering member 22, the covering member 22 may be allowed to shrink.

As another example of the method for manufacturing the optical element covering member 2, the at least one optical element 24 and the support medium 23 stacked thereon are inserted into the covering member 22 having an open-ended tubular shape. Subsequently, whenever necessary, the covering member 22 may be allowed to shrink by applying heat thereto. As a result, the optical element covering member 2, which is a targeted product, can be obtained.

EXAMPLES

Hereinafter, the present application will be described with reference to the examples; however, the present application is not limited only thereto.

Sample 1

First, the following optical element and support medium were prepared. The optical element and the support medium described above were formed for a 32-inch television having a size of 410 mm by 710 mm.

Reflection type polarizer (DBEFD manufactured by Sumitomo 3M Limited., thickness: 400 μm)

Lens sheet (Lens manufactured by Sony Corp. having a hyperboloidal shape by extrusion molding of polycarbonate (PC), pitch: 200 μm, thickness: 500 μm)

Diffusion sheet (BS-912 manufactured by Keiwa Inc., thickness 205 μm)

Diffusion plate (polycarbonate manufactured by Teijin Chemicals Ltd., thickness: 1,500 μm)

Light control film (brightness-irregularity-reducing film having a hyperboloidal shape by extrusion molding of polycarbonate (PC), pitch: 200 μm, thickness: 200 μm)

Next, on the light control film, the diffusion plate, the diffusion sheet, the lens sheet, and the reflection type polarizer were placed in that order, so that an optical element stack was obtained. Next, an original heat-shrinkable polypropylene film was prepared, and two rectangular films were obtained therefrom by cutting. In this step, the cutting was performed so as to form an angle of 1° between the long side and the orientation axis of the film.

Next, the above two films were overlapped with each other so that the orientation axes thereof formed an angle of 2°, and three sides of one film other than one long side thereof were heat welded to the respective three sides of the other film, thereby obtaining a bag-shaped covering member. Subsequently, from the open long side of the bag-shaped covering member, the above optical element stack was inserted therein. Next, the open long side was heat welded to seal the covering member, so that an optical element covering member was obtained. The heat welding was performed on the periphery of the covering member at 220° C. for 2 seconds. Subsequently, opening portions were formed in the covering member at places corresponding to corner portions of the optical element stack. Next, the optical element covering member was transported to an oven, and the covering member was allowed to shrink under conditions at a temperature 105° C. As a result, the optical element stack and the covering member were in close contact with each other, and the corner portions of the optical element stack were exposed from the opening portions provided at the corner portions of the covering member.

Accordingly, a targeted optical element covering member was obtained.

Samples 2 to 7

Optical element covering members were obtained in a manner similar to that of Sample 1 except that, as shown in the following Table 1, covering members made of films of polyolefin A (PP/PE base) and polyolefin B (PP/PE base) were used, and that the shrinkage range of the covering member was set as shown in Table 1.

Samples 8 to 10

Optical element covering members were obtained in a manner similar to that of Sample 1 except that, as shown in the following Table 1, covering members made of films of polyolefin (PE base) and polyolefin A (PP/PE base) were used, and that the size of the diffusion plate was changed to have a thickness of 0.002 m, a long-side length of 0.91 m, and a short-side length of 0.52 m.

Samples 11 and 12

Optical element covering members were obtained in a manner similar to that of Sample 1 except that, as shown in the following Table 1, covering members made of films of polyolefin A (PP/PE base) and polyolefin B (PP/PE base) were used, and that the size of the diffusion plate was changed to have a thickness of 0.002 m, a long-side length of 1.03 m, and a short-side length of 0.59 m.

Samples 13 to 16

Optical element covering members were obtained in a manner similar to that of Sample 1 except that, as shown in the following Table 1, covering members made of films of polyolefin A (PP/PE base) and polyolefin B (PP/PE base) were used, the opening portions were not provided at the corner portions of the covering member, and corners of the support medium were each chamfered to have a radius of 1 mm.

(Temperature Measurement in Actual TV)

The temperature on the optical element covering member at a light source side in an actual TV was measured by a thermocouple. According to the measurement results obtained from 9 points in the plane, the temperature was increased up to approximately 67° C. and was then maintained constant when lighting was performed at room temperature 25° C., and even when lighting was performed under conditions at a temperature of 50° C., the temperature was increased up to approximately 70° C. and was then maintained constant. Under conditions at a temperature of 50° C., a safety circuit was designed to control the temperature not to exceed 70° C., and when the covering member was placed at a temperature of 70° C., measurements of the tensile force and the like were performed.

(Measurement of Tensile Force of Covering Member)

By TMA (thermal stress-strain measurement instrument EXSTAR6000 TMA/SS) manufactured by Seiko Instruments Inc., the tensile force of the covering member was measured as described below.

First, while a tensile force was applied to the covering member, a test piece of 5 mm by 50 mm was obtained by cutting from a central portion of the optical element covering member using a mold having a rectangular shape. In this step, the test piece was cut so that the long and the short sides thereof were parallel to the long and the short sides, respectively, of the diffusion plate, which was the support medium. Next, after the test piece was held between glass plates so as to eliminate sag, the length of the test piece was measured by a toolmaker's microscope manufactured by Topcon Corp. Since the tensile force was released from the test piece which was obtained by cutting, it is placed in a shrunk state and had a length smaller than 50 mm. By performing dimensional conversion so that this shrunk state is returned to a state having an original length of 50 mm, a test piece for the TMA measurement was again obtained by cutting and was set in the apparatus therefor. Next, after the tensile force in the initial state at 25° C. was measured, the temperature was increased to 100° C., and the tensile force was measured when the temperature was decreased to 70° C. In this step, 70° C. is an ambient temperature in the vicinity of the test piece. The results are shown in Table 1 and FIG. 14.

(Calculation Method of Tensile Force of Covering Member)

The tensile forces of Samples 1 to 16 were calculated as follows by using the above equations (1) and (2). The results are shown in Table 1.

Samples 1 to 7, Samples 13 to 16 (32 Inches)

$F1=1.65\times10^4\times0.0015/0.71=34.9$ $F2=1.65\times10^4\times0.0015/0.41=60.4$ Samples 8 to 10 (40 inches)

$F1=1.65\times10^4\times0.002/0.91=36.3$ $F2=1.65\times10^4\times0.002/0.52=63.5$ Samples 11 and 12 (46 Inches)

$F1=1.65\times10^4\times0.002/1.03=32.0$ $F2=1.65\times10^4\times0.002/0.59=55.9$ (Measurement of Tensile Force of Covering Member)

First, a test piece was obtained by cutting from the optical element covering member across the sealed portion thereof by a mold of 5 by 50 mm, and a test piece for the TMA measurement was again obtained by cutting and was then set in the apparatus therefor. Next, after the tensile force in the initial state at 25° C. was measured, the temperature was increased to 70° C., and the tensile force at a temperature of 70° C. was measured.

(Measurement of Warpage of Covering Member)

A prepared sample was placed on a surface plate, and the warpage was measured at the four corners of the sample, so that the maximum warpage was obtained therefrom. The results are shown in Table 1.

(Evaluation by Actual Mounting Test)

As apparatuses for the actual mounting test, a 32-inch liquid crystal display television (trade name: LCDTV-J3000 manufactured by Sony Corp.), a 40-inch liquid crystal display television (trade name: LCDTV-J3000 manufactured by Sony Corp.), and a 46-inch liquid crystal display television (trade name: LCDTV-V2500 manufactured by Sony Corp.) were prepared. Next, after optical elements, that is, a diffusion plate, a diffusion sheet, a prism sheet, and a reflection type polarizer, of a backlight unit of the above liquid crystal display television were removed, and the optical element covering members of Samples 1 to 16 were each then again mounted, appearance evaluation of the panel display was performed in accordance with the following standard. The results are shown in Table 1.

5: No luminance irregularities at a front side and at a viewing angle of 60°;

4: No on-axis luminance irregularities/extremely slight luminance irregularities at a viewing angle of 60°;

3: Extremely slight on-axis luminance irregularities/slight luminance irregularities at a viewing angle of 60°;

2: Slight on-axis luminance irregularities/luminance irregularities at a viewing angle of 60°; and 1: Apparent luminance irregularities at a front side and a viewing angle of 60°.

In this evaluation, a panel display at a level of "3" or above can be used without causing any practical problems.

(Evaluation of Creaking Noise)

After the TV, which was turned on, mounting the optical element covering member was stored for 2 hours under conditions at a temperature 25° C., it was turned off, and the generation of creaking noise was evaluated for 1 hour. In particular, under measurement conditions of 25 dB or less, a maximum noise of 40 dB or more was evaluated as "generation of creaking noise", and a maximum noise of less than 40 dB was evaluated as "no creaking noise". In addition, for this measurement, NL-32 manufactured by Lion Co., Ltd. was used. The results are shown in Table 1.

TABLE 1

| | | | Covering Member | | | | | | Support-Medium Size | |
|---|---|---|---|---|---|---|---|---|---|---|
| | | | | | Shrinkage Range | | | | | |
| | | | Corner | | Long | Short | Support Medium | | Long | Short |
| | | | of | | | | | | | |
| Sample | Material Polyolefin | Entire Shape | Support Medium | Thickness (μm) | Side (mm) | Side (mm) | Thickness ($10^{-3}$ mm) | Corner Shape | Side (m) | Side (m) |
| 1 | Polyolefin (PE base) | 6 surfaces/bag | C6 open | 30 | 70 | 76 | 1.5 | R6 | 0.71 | 0.41 |
| 2 | A(PP/PE base) | 6 surfaces/bag | C6 open | 30 | 40 | 23 | 1.5 | R6 | 0.71 | 0.41 |
| 3 | A(PP/PE base) | 6 surfaces/bag | C6 open | 30 | 43 | 25 | 1.5 | R6 | 0.71 | 0.41 |
| 4 | A(PP/PE base) | 6 surfaces/bag | C6 open | 30 | 38 | 9 | 1.5 | R6 | 0.71 | 0.41 |

TABLE 1-continued

| | | | | | | | | | | |
|---|---|---|---|---|---|---|---|---|---|---|
| 5 | A(PP/PE base) | 6 surfaces/bag | C6 open | 30 | 32 | 8 | 1.5 | R6 | 0.71 | 0.41 |
| 6 | A(PP/PE base) | 6 surfaces/bag | C6 open | 30 | 32 | 5 | 1.5 | R6 | 0.71 | 0.41 |
| 7 | B(PP/PE base) | 6 surfaces/bag | C6 open | 50 | 67 | 33 | 1.5 | R6 | 0.71 | 0.41 |
| 8 | Polyolefin (PE base) | 6 surfaces/bag | C6 open | 30 | 81 | 85 | 2.0 | R6 | 0.91 | 0.52 |
| 9 | A(PP/PE base) | 6 surfaces/bag | C6 open | 30 | 46 | 16 | 2.0 | R6 | 0.91 | 0.52 |
| 10 | A(PP/PE base) | 6 surfaces/bag | C6 open | 30 | 37 | 6 | 2.0 | R6 | 0.91 | 0.52 |
| 11 | A(PP/PE base) | 6 surfaces/bag | C6 open | 30 | 63 | 33 | 2.0 | R6 | 1.03 | 0.59 |
| 12 | B(PP/PE base) | 6 surfaces/bag | C6 open | 50 | 62 | 56 | 2.0 | R6 | 1.03 | 0.59 |
| 13 | A(PP/PE base) | 6 surfaces/bag | C6 open | 30 | 39 | 18 | 1.5 | R1 | 0.71 | 0.41 |
| 14 | A(PP/PE base) | 6 surfaces/bag | C6 open | 30 | 32 | 5 | 1.5 | R1 | 0.71 | 0.41 |
| 15 | A(PP/PE base) | 6 surfaces/bag | Closed | 30 | 41 | 20 | 1.5 | R1 | 0.71 | 0.41 |
| 16 | A(PP/PE base) | 6 surfaces/bag | Closed | 30 | 31 | 8 | 1.5 | R1 | 0.71 | 0.41 |

| Sample | Calculated Value of Warpage Suppression (N/m) | | 70° C. Measured Tensile Force (N/m) | | Optical Element | Appearance of | Generation of |
|---|---|---|---|---|---|---|---|
| | Long Side Direction (N/m) | Short Side Direction (N/m) | Long Side Direction (N/m) | Short Side Direction (N/m) | Covering Member Warpage (mm) | Liquid Crystal Display Device | Creaking Noise (40 dB or more) |
| 1 | 34.9 | 60.4 | 27.3 | 35.1 | 9 | 5 | No |
| 2 | 34.9 | 60.4 | 32.2 | 40.3 | 11 | 5 | No |
| 3 | 34.9 | 60.4 | 28.7 | 36.6 | 6 | 5 | No |
| 4 | 34.9 | 60.4 | 34.4 | 60.1 | 16 | 4 | No |
| 5 | 34.9 | 60.4 | 39.4 | 62.8 | 22 | 2 | No |
| 6 | 34.9 | 60.4 | 39.4 | 66 | 24 | 2 | No |
| 7 | 34.9 | 60.4 | 33.3 | 62.4 | 27 | 2 | Yes |
| 8 | 36.3 | 63.5 | 28.5 | 40.8 | 13 | 5 | No |
| 9 | 36.3 | 63.5 | 35.8 | 55 | 17 | 4 | No |
| 10 | 36.3 | 63.5 | 43 | 66 | 27 | 2 | Yes |
| 11 | 32.0 | 55.9 | 28.7 | 40.3 | 11 | 5 | No |
| 12 | 32.0 | 55.9 | 38.9 | 58.3 | 24 | 2 | Yes |
| 13 | 34.9 | 60.4 | 33 | 47.6 | 12 | 5 | No |
| 14 | 34.9 | 60.4 | 39.4 | 66 | 21 | 2 | No |
| 15 | 34.9 | 60.4 | 30.8 | 44 | 7 | 5 | No |
| 16 | 34.9 | 60.4 | 40.8 | 62.3 | 23 | 2 | No |

In Table 1, "A" and "B" of the column "Material Polyolefin", "C6 open", and "Shrinkage Range" indicate the following.

A: Heat shrinkable film having a multilayer structure of polypropylene/(polypropylene+polyethylene)/polypropylene and a thickness of 30 μm.

B: Heat shrinkable film having a multilayer structure of polypropylene/(polypropylene+polyethylene)/polypropylene and a thickness of 50 μm.

"C6 open": Chamfered corners of the covering member, each of which has a chamfer surface between two points each apart from the corner by 6 mm.

"Shrinkage Range": Difference in size between the support medium and the covering member, the range including no welding portion.

From Table 1, the following can be understood.

First, as for Samples 1 to 7 having a 32-inch size, when the tensile forces F1 and F2 of the covering member at a temperature of 70° C. satisfy F1>34.9 and F2>60.4, the warpage is increased, and in the evaluation by actual mounting test, the image quality is liable to be degraded.

Next, as for Samples 8 to 10 having a 40-inch size, when the tensile forces F1 and F2 of the covering member at a temperature of 70° C. satisfy F1>36.3 and F2>63.5, the warpage is increased, and in the evaluation by actual mounting test, the image quality is liable to be degraded.

Next, as for Samples 11 and 12 having a 46-inch size, when the tensile forces F1 and F2 of the covering member at a temperature of 70° C. satisfy F1>32.0 and F2>55.9, the warpage is increased, and in the evaluation by actual mounting test, the image quality is liable to be degraded.

Accordingly, when the tensile forces at 70° C. exceed the values defined by the above equations (1) and (2), the warpage is increased, and in the TV actual mounting test, the image quality is liable to be degraded. In addition, also in the case in which the evaluation was performed by changing the size of TV, when the tensile forces exceed the above values, warping is liable to occur, and the TV image quality is liable to be degraded.

The reason for this is believed that in the state in which the diffusion plate used as the support medium is liable to be softened by heat at a high temperature of 70° C., since the tensile force of the covering member has an effect of applying a stress to the support medium in a shrinkage direction, the warping occurs.

Sample 17

An optical element covering member was obtained in a manner similar to that of Sample 1.

Samples 18 to 20

Optical element covering members were obtained in a manner similar to that of Sample 1 except that when rectangular films were obtained from an original film by cutting, the cutting was performed so that the long side and the orientation axis of the rectangular film form an angle of 3.5°, 8°, or 12°.

Samples 21 to 24

Optical element covering members were obtained in a manner similar to that of Sample 1 except that as a film forming the optical element covering member, a film of polyolefin A was used, and that when rectangular films were obtained from an original film by cutting, the cutting was performed so that the long side and the orientation axis of the rectangular film form an angle of 1.2°, 3°, 7°, or 10°.

(Measurement of Orientation Axis)

The orientation axis of the covering member of each of Samples 17 to 24 thus obtained was measured as described below. First, a test piece having a square shape of 100 mm by 100 mm was cut from the covering member parallel to the support medium of the optical element covering member. By using this test piece, the angle of the orientation axis inclined to the end portion of the test piece was measured by a retardation measurement device manufactured by Otsuka Electronics Co., Ltd. The results are shown in Table 2.

(Warpage Evaluation of Optical Element Covering Member)

The optical element covering members of a 32-inch size (Samples 1 to 7, 13 to 16), a 40-inch size (Samples 8 to 10), and a 46-inch size (Samples 11 and 12) were each placed on a backlight used in a television manufactured by Sony Corporation, and after the backlight was turned on for 1 hour, the warpage of the optical element covering member was measured using a metal ruler. In addition, the measured warpage was evaluated in accordance with the following three grades. The results are shown in Table 2.

3: Warpage of less than 10 mm
2: Warpage in the range of 10 mm to less than 20 mm
1: Warpage of 20 mm or more In this evaluation, an optical element covering member at a level of "2" or above can be used without causing any practical problems.

(Appearance Evaluation)

The appearance of the optical element covering member was evaluated in a manner similar to that of Sample 1 described above. The results are shown in Table 2.

TABLE 2

| Sample | Material Polyolefin | Angle between Orientation Axis and Long side of Film Forming Covering Member (°) | Warpage of Optical Element Covering Member (mm) | Appearance of Optical Element Covering Member (—) | | Appearance of Liquid Crystal Display Device |
|---|---|---|---|---|---|---|
| 17 | Polyolefin (PE base) | 1 | 0.5 | 3 | Excellent | 5 |
| 18 | Polyolefin (PE base) | 3.5 | 1 | 3 | Excellent | 5 |
| 19 | Polyolefin (PE base) | 8 | 2 | 2 | Slight looseness at corner | 4 |
| 20 | Polyolefin (PE base) | 12 | 4 | 1 | Sag at corner | 2 |
| 21 | A(PP/PE base) | 1.2 | 0.5 | 3 | Excellent | 5 |
| 22 | A(PP/PE base) | 3 | 1 | 3 | Excellent | 5 |
| 23 | A(PP/PE base) | 7 | 1 | 2 | Slight looseness at corner | 4 |
| 24 | A(PP/PE base) | 10 | 2 | 1 | Sag at corner | 2 |

From Table 2, the following can be understood.

When the angles formed between the orientation axes of the first region and the second region of the covering member and the side surface of the support medium are set in the range of 1 to 8°, the warpage of the optical element covering member can be reduced, and in addition, the generation of sags, irregularities, and wrinkles can be suppressed.

Sample 25

An optical element covering member was obtained in a manner similar to that of Sample 2.

Sample 26

An optical element covering member was obtained in a manner similar to that of Sample 25 except that heat welding was performed by heating the periphery of the covering member at 220° C. for 1 second.

Sample 27

An optical element covering member was obtained in a manner similar to that of Sample 25 except that heat welding was performed by heating the periphery of the covering member at 220° C. for 0.5 seconds.

(Measurement of Sealing Tensile Force)

First, after a test piece was obtained by cutting from the optical element covering member across the sealed portion thereof using a mold having a size of 5 by 50 mm, and a test piece for the TMA measurement was obtained by re-cutting and was then set in the apparatus therefor. Subsequently, after the tensile force in the initial state at 25° C. was measured, the temperature was increased to 70° C., and the tensile force at a temperature of 70° C. was measured. The results are shown in Table 3.

(Appearance Evaluation after High Temperature Storage)

After the optical element covering member was stored for 500 hours under 70° C./dry conditions, the change in appearance was evaluated. The results are shown in Table 3.

TABLE 3

| Sample | Material Polyolefin | Sealing Method (Heating Conditions) | Tensile Force of Sealed Portion (N/m) | | | | Tensile Force of Optical Element Covering Member (N/m) | | | | Appearance 70° C. × 500 H |
|---|---|---|---|---|---|---|---|---|---|---|---|
| | | | 25° C. | | 70° C. | | 25° C. | | 70° C. | | |
| | | | MD | TD | MD | TD | MD | TD | MD | TD | |
| 25 | A(PP/PE base) | 220° C. × 2 sec | 454 | 917 | 156 | 320 | 99 | 71.3 | 33.7 | 40.3 | No Change |
| 26 | A(PP/PE base) | 220° C. × 1 sec | 204 | 393 | 70 | 125 | | | | | No Change |
| 27 | A(PP/PE base) | 220° C. × 0.5 sec | 89 | 165 | 28 | 56 | | | | | Breakage at End Portion |

From Table 3, the following can be understood.

When the tensile force F of the sealed portion is smaller than the tensile force F of the covering member, the sealed portion may be separated apart during high temperature storage, and the covering member may be damaged in some cases. Hence, the tensile force F of the sealed portion is preferably set larger than that of the covering member.

Heretofore, the embodiments of the present application have been described in detail; however, the present application is not limited to the above embodiments, and various modifications and changes may be made without departing from the technical concept of the present application.

For example, the numerical values in the above embodiments are shown merely by way of example, and whenever necessary, different numerical values may also be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element enclosure comprising:

one, two, or more film-shaped or sheet-shaped optical elements;

a plate-shaped supporting member supporting said one, two, or more optical elements; and a contractive enclosing member enclosing said one, two, or more optical elements and said supporting member, wherein said one, two, or more optical elements and said supporting member form a laminate body, said laminate body has an incident plane in which light from a light source enters, an emitting plane from which the light entered from said incident plane is emitted, and an edge surface locating between said incident plane and said emitting plane, said enclosing member is closely adhered to said laminate body and encloses the emitting plane, incident plane, and all edge surfaces of said laminate body, at least one opening portion is provided for said enclosing member, wherein the opening portion of said enclosing member is provided for a corner/curvature portion of said supporting member, and a thickness t of said supporting member, a length L of side of said supporting member, and a tension F of said enclosing member satisfy the following relational expression (1) under an environment of a temperature of 70° C., $$0 \leq F \leq 1.65 \times 10^4 \times t/L \tag{1}$$

(where, in the expression (1), t, L, and F indicate the following elements:

t: distance between the incident plane and the emitting plane of the supporting member L: length of side closed by said enclosing member among the sides constructing a plane perpendicular to the thickness t F: tension of the enclosing member which acts on the side of the length L in the parallel direction).

2. The optical element enclosure according to claim 1, wherein
the thickness t of said supporting member, lengths L1 and L2 of sides forming the incident plane and the emitting plane of said supporting member, and tensions F1 and F2 of the enclosing member which respectively act on the sides of said lengths L1 and L2 in the parallel direction satisfy the following relational expressions (2) and (3) under the environment of the temperature of 70° C., $$0 \leq F1 \leq 1.65 \times 10^4 \times t/L2 \qquad (2)$$

$$0 \leq F2 \leq 1.65 \times 10^4 \times t/L1 \qquad (3).$$

3. The optical element enclosure according to claim 1, wherein said enclosing member has heat contraction performance.

4. The optical element enclosure according to claim 1, wherein said enclosing member has contraction performance due to an extension enclosure.

5. The optical element enclosure according to claim 1, wherein
said enclosing member has a joint portion obtained by joining edge portions of said enclosing member, and
a strength of said joint portion is larger than said tension F.

6. The optical element enclosure according to claim 1, wherein
said enclosing member has a first area and a second area with which the incident plane and the emitting plane of said supporting member are respectively covered, and
an angle between orientation axes of said first and second areas and the side of said length L is equal to 80° or less.

7. The optical element enclosure according to claim 1, wherein
said enclosing member has a first, area and a second area with which the incident plane and the emitting plane of said supporting member are respectively covered, and
an optical function layer is provided for at least either said first area or said second area.

8. A backlight having the optical element enclosure according to any one of claims 1 to 7.

9. A liquid crystal display apparatus having the optical element enclosure according to any one of claims 1 to 7.

10. An optical element enclosure comprising:
a plate-shaped supporting member; and
a contractive enclosing member enclosing said supporting member,
wherein said supporting member has an incident plane in which light from a light source enters, an emitting plane from which the light entered from said incident plane is emitted, and an edge surface locating between said incident plane and said emitting plane,
said enclosing member is closely adhered to said supporting member and encloses the emitting plane, incident plane, and all edge surfaces of said supporting member,
at least one opening portion is provided for said enclosing member, wherein the opening portion of said enclosing member is provided for a corner/curvature portion of said supporting member, and a thickness t of said supporting member, a length L of side of said supporting member, and a tension F of said enclosing member satisfy the following relational expression (1) under an environment of a temperature of 70° C., $$0 \leq F \leq 1.65 \times 10^4 \times t/L \qquad (1)$$

(where, in the expression (1), t, L, and F indicate the following elements:
t: distance between the incident plane and the emitting plane of the supporting member
L: length of side closed by said enclosing member among the sides constructing a plane perpendicular to the thickness t
F: tension of the enclosing member which acts on the side of the length L in the parallel direction).

11. The optical element enclosure according to claim 10, wherein
the thickness t of said supporting member, lengths L1 and L2 of sides forming the incident plane and the emitting plane of said supporting member, and tensions F1 and F2 of the enclosing member which respectively act on the sides of said lengths L1 and L2 in the parallel direction satisfy the following relational expressions (2) and (3) under the environment of the temperature of 70° C., $$0 \leq F1 \leq 1.65 \times 10^4 \times t/L2 \qquad (2)$$

$$0 \leq F2 \leq 1.65 \times 10^4 \times t/L1 \qquad (3).$$

12. The optical element enclosure according to claim 10, wherein said enclosing member has heat contraction performance.

13. The optical element enclosure according to claim 10, wherein said enclosing member has contraction performance due to an extension enclosure.

14. The optical element enclosure according to claim 10, wherein
said enclosing member has a joint portion obtained by joining edge portions of said enclosing member, and
a strength of said joint portion is larger than said tension F.

15. The optical element enclosure according to claim 10, wherein
said enclosing member has a first area and a second area with which the incident plane and the emitting plane of said supporting member are respectively covered, and
an angle between orientation axes of said first and second areas and the side of said length L is equal to 8° or less.

16. The optical element enclosure according to claim 10, wherein
said enclosing member has a first area and a second area with which the incident plane and the emitting plane of said supporting member are respectively covered, and
an optical function layer is provided for at least either said first area or said second area.

17. An optical element enclosure according to any one of claims 10 to 16, wherein at least one of the optical elements selected from a light diffusing element, a light converging element, a reflecting type polarizer, a polarizer, and a light dividing element is included in said enclosing member.

18. A backlight having the optical element enclosure according to. any one of claims 10 to 16.

19. A liquid crystal display apparatus having the optical element enclosure according to any one of claims 10 to 16.

* * * * *